Feb. 11, 1969    R. L. NORTON    3,426,664
SELF-DEVELOPING CAMERA
Filed Dec. 23, 1966    Sheet 1 of 4

INVENTOR.
Robert L. Norton
BY
Brown and Mikulka
and
Robert E. Corb
ATTORNEYS

FIG. 5

3,426,664
SELF-DEVELOPING CAMERA
Robert L. Norton, Norfolk, Mass., assignor to Polaroid Corporation, Cambridge, Mass., a corporation of Delaware
Filed Dec. 23, 1966, Ser. No. 604,304
U.S. Cl. 95—13
Int. Cl. G03b 17/48
14 Claims

ABSTRACT OF THE DISCLOSURE

A self-developing camera for imaging a portion of a scene on a photosensitive recording medium and moving the image and recording medium simultaneously during exposure to form an image of the scene in the recording medium. The camera comprises a motor-driven film transport system including a conveyor for advancing successive film units from a film pack through an exposure station to expose each film unit and then between a pair of liquid spreading members and into a processing chamber in the camera; and an optical system for forming an image at the film unit in the exposure station and moving the image to hold the image stationary with respect to the moving film unit during exposure. The camera is very compact having a relatively small front-to-rear dimension as compared with the dimensions of the image and each film unit is transported lengthwise in opposite directions during exposure and processing.

---

The present invention is concerned with the structure of a self-developing camera of the type shown and described in the copending U.S. patent application of Edwin H. Land, Ser. No. 549,961, filed May 13, 1966, now Patent No. 3,316,823, issued May 2, 1967. The camera generally comprises an optical system for forming an image at an image surface, means providing a shutter aperture near the image surface, means for moving the image in the image surface relative to the aperture and means for moving a photosensitive image-recording medium behind the aperture to maintain the image and recording medium stationary with respect to one another and effect the exposure of the recording medium to produce an image therein. Exposure of the image-recording medium occurs during movement thereof past the aperture which, in cooperation with the means for moving the recording medium, functions in the nature of a shutter to initiate and terminate exposures as well as to control the amount of light energy reaching the recording medium. The camera, at least insofar as the operator is concerned is designed to take normal angle photographs in a conventional manner, thus necessitating relatively rapid motion of the film during exposure. Processing of the image-recording medium is effected in the camera by distributing a processing liquid in contact with the exposed recording medium, and in the compact form of camera shown, occurs during exposure of the recording medium so that the system for transporting the image-recording medium through the camera is an integral component of both the exposure and processing systems and both exposure and processing are dependent upon the operation of the transport system.

Objects of the invention are: to provide a compact camera structure including means for transporting a film unit including a light-sensitive image-recording medium from an initial position to a terminal position within the camera and exposing and processing the film unit during movement through the camera between the initial to the terminal positions; and to provide a film transport system capable of moving film units at a relatively rapid and uniform rate during exposure and processing.

Other objects of the invention are to provide, in a camera of the character described, a novel and improved transport system that is a component of both the exposure and processing systems and coordinates and controls the operation of the other components of the exposure and processing systems; and to provide a film transport system for effecting the exposure and processing of a succession of film units initially introduced into the camera as components of a film pack.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

The basic components of the camera of the invention include a relatively thin housing for mounting and enclosing a film pack or assembly of film units each including a pair of rectangular sheet-like elements and a container of processing liquid, and the components of the camera exposure and processing systems including an image-forming optical system comprising at least one component, e.g., a lens, located near one end of the camera housing and a processing system comprising a pair of liquid spreading members located near the opposite end of the camera housing. The exposure system includes a relatively narrow shutter aperture equal in length to the width of the image area located at the image surface of the optical system near the liquid spreading members and in order to achieve a high degree of compactness relative to picture size, each film unit is mounted in a generally planar configuration in an initial position within a storage chamber between the one end of the camera and the shutter aperture and is moved from its initial position toward the opposite end of the camera past the shutter aperture to expose the film unit and then between the liquid spreading members to spread the processing liquid from the container between the sheet-like elements of the film unit. During exposure of the film unit, at least one component of the optical system, e.g., a mirror, is moved so as to move the image, formed by the optical system, relative to the shutter aperture in the same direction and at the same speed as the film unit so that the film unit and image remain stationary with respect to one another. The direction of movement of the film unit is reversed at the opposite end of the camera housing and the film unit is moved from the liquid spreading members into a terminal position within a processing chamber in which the film unit is held in a plane adjacent its initial position. The light path of the optical system extends from the one end of the camera housing toward the shutter aperture between the storage and processing chambers. The camera housing includes a door on one side permitting loading of an assembly or pack of film units into the storage chamber and a door in the opposite side permitting withdrawal of an exposed and processed film unit from the processing chamber.

The transport system of the camera is required to move the film at a relatively rapid uniform rate comparable to the rate of movement of a focal plane shutter of the same size and comprises one (or two) endless belt supported for movement along a path extending toward the ends of the camera housing. The belt functions as a component of the exposure system by advancing each film unit between the liquid spreading members into the shutter aperture to expose the film unit and as a component of the processing system by advancing the exposed film unit between the liquid spreading members into the processing chamber. The belt is also coupled with the movable component or components, e.g., mirror, of the optical system to properly coordinate image and film motion and to move the film unit at a constant predetermined speed during exposure and processing, at least portions of which occur simultaneously. The processing and transport systems are combined insofar as the liquid spreading elements comprise a pair of juxtaposed cylinders one of which, for the sake of compactness, encloses or is a component of a drive motor and the belt extends around one of the spreading elements between the spreading elements so as to be driven thereby and, in turn, advance the film unit and drive the optical system.

For the fuller understanding of the nature and objects of the invention, reference should be had to the following detailed description taken in connection with the accompanying drawings wherein.

Figure 2:
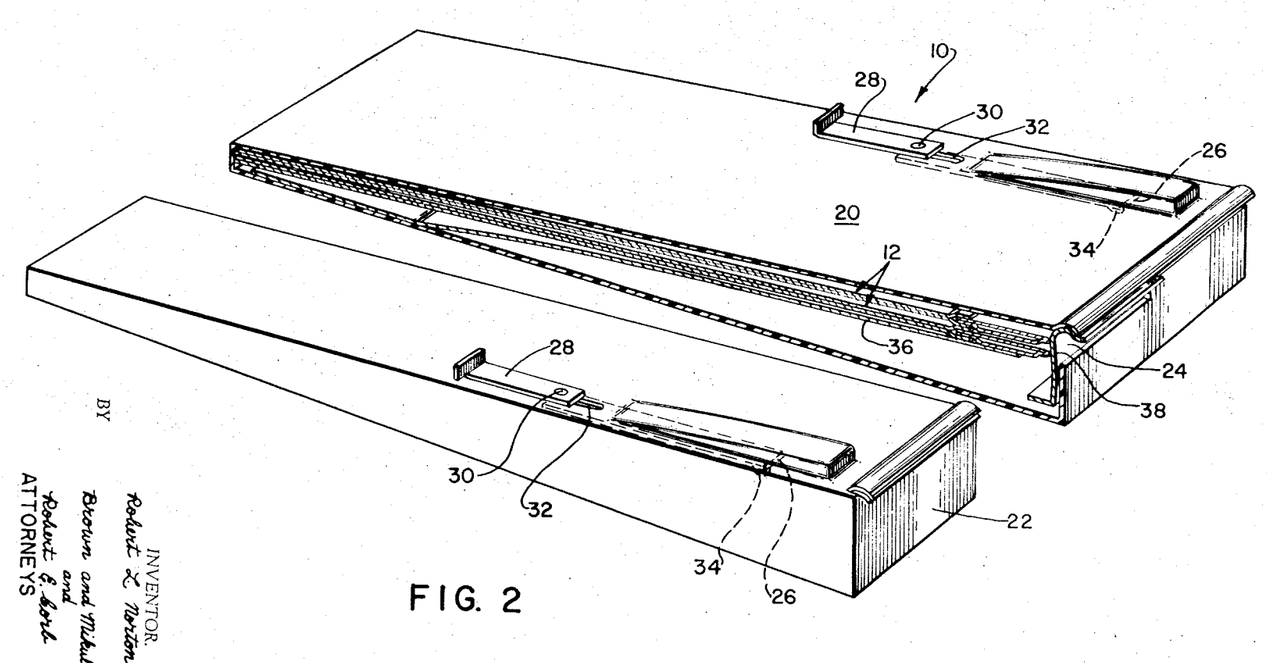
FIG. 2 is a perspective view partially in section illustrating a film pack of the type adapted for use with the camera of the invention.
Figure 3:
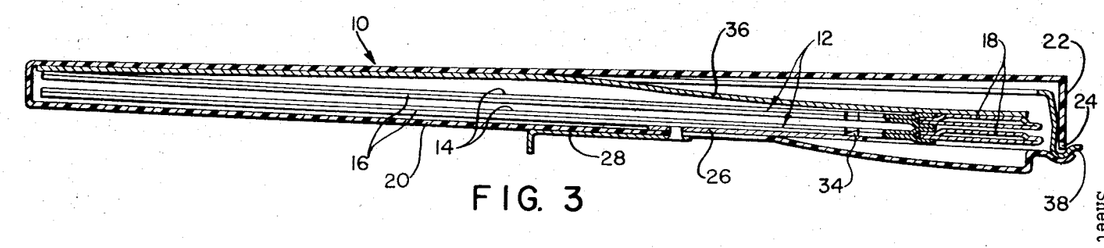
FIG. 3 is an elevational, sectional view of the film pack of FIG. 2.

Reference is now made to FIGS. 2 and 3 of the drawings wherein there is illustrated a film pack or assembly of film units of the type adapted to be used in the camera of the invention. The film pack described in greater detail in the copending U.S. patent application of Robert L. Norton et al., Ser. No. 604,340, filed Dec. 23, 1966, includes a housing or container 10 for enclosing a plurality of film units each designated 12. Each film unit 12 comprises a generally rectangular sheet-like photosensitive image-recording element 14 and a second rectangular sheet-like element 16 disposed in face-to-face relation with the image-recording element. The image-recording element is preferably opaque to actinic light and carries on the side thereof facing the second element a layer of a photographically useful light-sensitive image-recording medium such as silver halide in which an image can be formed by exposure to actinic light. The second element is preferably transparent and permits exposure of the image-recording element by light transmitted through the second element while the two elements remain in superposition. Each film unit 12 includes a rupturable container 18 comprising a rectangular blank of a liquid impermeable sheet material folded upon itself and sealed along three sides to form a cavity filled with a viscous liquid processing agent preferably adapted, when distributed between an exposed image-recording element 14 and a second element 16, to produce a visible positive image by a diffusion transfer process. Container 18 is elongated and the longitudinal edge seal comprises a mouth adapted to open and permit the unidirectional discharge of the liquid contents of the container in response to the application of compressive pressure to the container. The edge portions of the container comprising the discharge mouth are secured between the leading edge portions of the image-recording and second elements in position to cause the container to discharge its contents between the elements as the film unit is advanced leading end first between a pair of pressure-applying members.

A plurality of film units 12 are initially provided in stacked relation within container 10 adapted to completely enclose the film units in a light-tight environment. Container 10 includes a forward wall 20 cooperating with an end wall 22 to define a narrow opening 24 through which film units 12 may be advanced leading end foremost. In the form shown, the film pack includes means for engaging the forward most film unit and movable by the transport system of the camera for advancing the forward most film unit, leading end first, from container 10 through opening 24. This film advancing means comprises a flat film engagement member 26 mounted for reciprocating movement on the inside of forward wall 20 and coupled with an L-shaped drive member 28 mounted on the exterior of forward wall 20 by suitable coupling means such as a rivet 30 extending through a slot 32 in forward wall 20. The film engagement and drive members 26 and 28 extend beyond the sides of the slot to prevent the admission of light through slot 32 into the film pack container. Each film unit includes a notch in one lateral edge adapted to be engaged by a projection 34 on film engagement member 26 to advance the film unit toward opening 24 in response to engagement and movement of drive member 28 by a component of the film transport system of the camera. Film units 12 are supported against forward wall 20 in engagement with projection 34 and in position to be advanced through opening 24 by a spring 36 mounted behind the stack of film units between the latter and opposite wall of the film container. Means in the form of a spring 38 are provided for closing aperture 24 against the admission of light into container 10.

Alternative embodiments of the film pack shown include a construction adapted for use in a camera in which the film transport system is designed to directly engage a film unit to advance it from the film pack container rather than engage a film engagement member that is an integral portion of the film pack. Such a film pack might merely include an elongated opening in forward wall 20 through which a suitable projection comprising a component of the film transport system of the camera may extend into engagement with a notch in the edge of the film unit. The film pack shown and described is designed for use with a film transport system comprising a single belt whereas systems comprising two substantially identical belts are also considered to fall within the scope of the invention so that a film unit for use in this type of camera would include two film engagement systems similar to the one shown and described herein.

Figure 1:
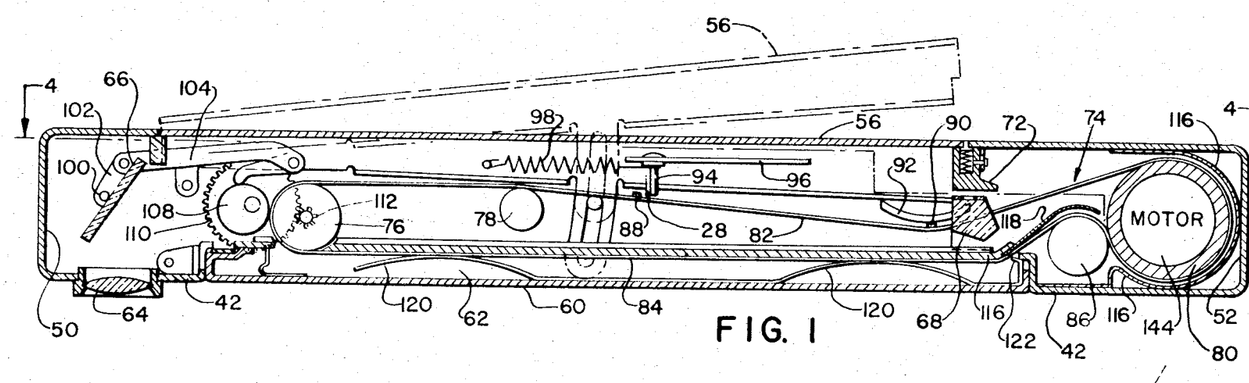
FIG. 1 is an elevational, sectional view taken from front to rear substantially midway between the sides of a camera embodying the invention.
Figure 4:
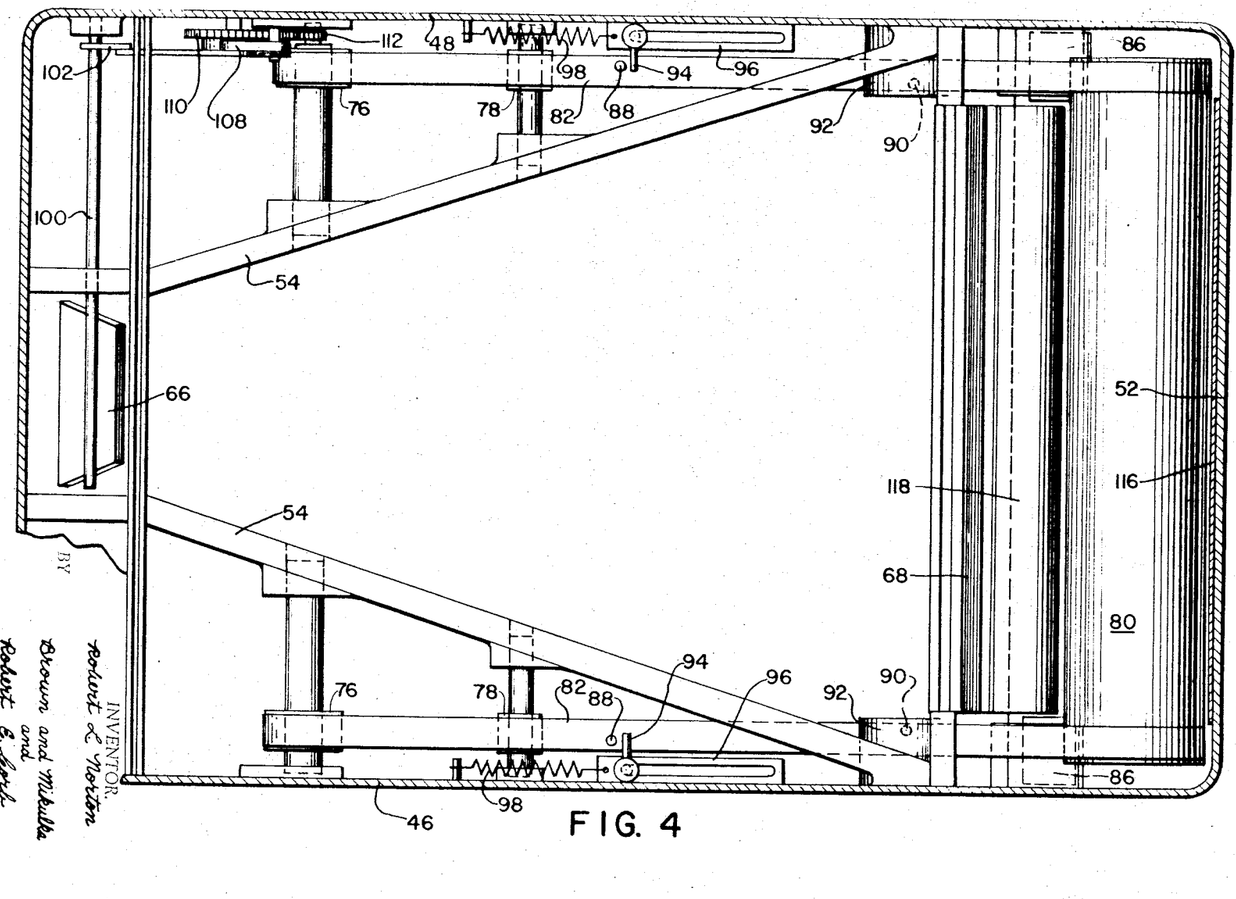
FIG. 4 is a sectional plan view of the camera the section being taken along the line 4—4 in FIG. 1 to show the camera with a wall (rear) of the housing removed to illustrate the components of the camera.
Figure 5:
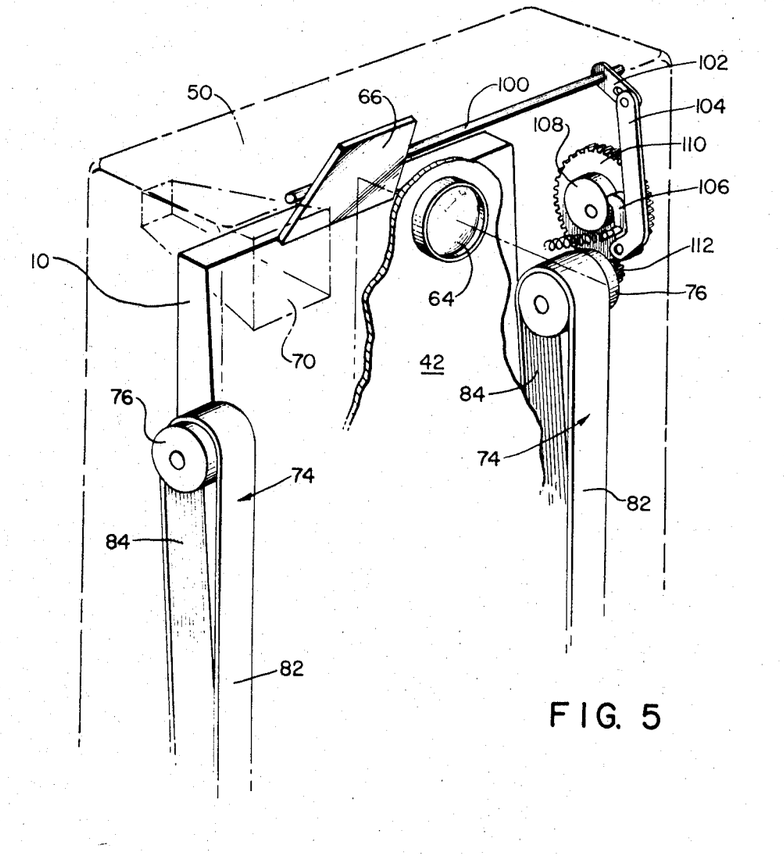
FIG. 5 is a phantom perspective view of a portion of the camera of FIG. 1.

The camera of the invention illustrated in FIGS. 1, 4 and 5 of the drawings is in the form of a handheld, self-developing panoramic type camera 40 comprising a relatively thin (as compared with picture size) parallelpiped-shaped housing including a forward wall 42, rear wall 44, side walls 46 and 48 and end walls 50 and 52 mounted on a supporting frame or chassis 54 which functions to mount and support the remaining operating components of the camera mechanism. The camera housing includes space to the rear of the chassis 54 intermediate the ends of the camera housing comprising a storage chamber for holding a film pack and a door or moveable panel 56 in rear wall 44 to permit loading of a film pack into the camera housing. The housing also includes an inner forward wall 58 cooperating with a door or moveable panel 60 in forward wall 42 to provide a processing chamber 62 spaced from and juxtaposed with the storage chamber for holding one or more film units following exposure thereof and spreading of the processing liquid therein. Forward door 60 is designed to prevent the admission of light into the processing chamber 62 and may be opened to withdraw a film unit from the processing chamber without admitting light to the interior of other parts of the camera housing. By virtue of this construction, the thickness of all but the end portions of the camera is determined by the space requirements of the film pack, the optical path and processing film which, in the configuration shown, all have two relatively large (length and width) dimensions and one relatively small (thickness) dimension.

The exposure system of the camera includes an optical system comprising an objective lens 64, which may be of a conventional type including an aperture stop, mounted on forward wall 42 adjacent end wall 22. The construction and mounting of lens 64 may be conventional or provision may be made for changing the focal length and/or direction of the optical axis of the lens during exposure in order to move the image produced by the lens and/or correct for distortions produced by other components of the optical system and inherent in panoramic type cameras. The optical system of the camera also includes reflecting means in the form of a mirror 66 mounted immediately behind lens 64 for pivotal motion about an axis perpendicular to and intercepting the optical axis of the lens and lying in a plane parallel with the plane of movement of the portion of the film being exposed. Mirror 66 is pivotable to move the image during exposure of the recording medium in order to maintain the recording medium and an image formed by lens 64 substantially stationary during exposure and movement of the recording medium past the shutter aperture. This results in the scanning of a narrow portion of the scene corresponding to the shutter aperture.

In the form of the camera shown, the long dimension of the optical path is parallel with the long dimension of the camera and the direction of movement of the recording medium during exposure and, due to the nature of the film system being employed, includes means providing for an odd number of reflections to produce a rectified image as well as to direct light from the lens onto the recording medium in a direction generally perpendicular to the plane of the recording medium during exposure thereof. These last two functions are performed by reflecting means in the form of a pentaprism 68 mounted in the path of light from mirror 66 near the opposite end of the storage chamber close to end wall 52 of the camera housing. It should be apparent that the optical system including the objective lens and mirrors may be modified substantially in a number of ways to achieve a particular result, to correct for distortions or to produce a particular motion of the image and that such modifications are properly considered to fall within the scope of the invention.

The camera housing incorporates a conventional view finder 70 also mounted in the end of the camera housing containing lens 64 and mirror 66 and, if desired, other features including, for example, a range finder, a photometric system for controlling the diaphragm associated with the lens, and a flash gun or other device for artificially illuminating a subject.

In the camera of the invention, exposure of a photosensitive element to produce an image of a scene therein is effected by moving the film unit of which the element is a component, in an exposure plane past the relatively narrow aperture extending transversely of the direction of movement of the film unit and from side to side of the area of the photosensitive element to be exposed. An image of the scene is formed at the exposure plane and is moved relative to the aperture in the same direction and at the same speed as the image-recording element so as to scan a relatively narrow incremental area of the scene from one side of the scene to the other. Since exposure occurs only during movement of the photosensitive element in the exposure plane past the aperture, a shutter is not required because exposure is initiated when the leading end of the photosensitive element is moved into alignment with the aperture and is terminated as the trailing end of the photosensitive element is moved from alignment with the aperture. Exposure is comparable with that produced by a focal plane shutter insofar as both involve the motion of an aperture near the focal plane relative to the film and, of course, differs therefrom in that it is the film that is moved rather than the aperture. The film transport system and aperture thus cooperate to function as a shutter for producing an exposure the duration of which, for any incremental area of the film, is a function of the aperture width and the speed of movement of the film past the aperture. The total time required to make an exposure is a function of the length of the photosensitive element and the speed of its movement. For example, an area of a photosensitive element three inches in length may be subjected to an exposure of one $\frac{1}{60}$ second by moving the element past an aperture having a width of 0.15 inch a rate of nine inches per second, with the total time required for exposure being $\frac{1}{3}$ second.

The optical system is designated to form an image at a surface in the camera termed the "image surface," and suitable means are provided for defining a relatively long narrow aperture at this image surface. In the form shown, this aperture and the image surface are located slightly to the rear of the rear surface of pentaprism 68 which is positioned in alignment with opening 24 in a film pack mounted within the storage chamber of the camera housing. The aperture itself may be defined by the pentaprism, by a mask on the rear surface of the pentaprism or an aperture plate located at the rear surface of the pentaprism. The aperture is at least equal in length to the width of the image-recording element to be exposed and extends transversely of the direction of movement of the image-recording element behind and across the aperture during exposure. As a means for guiding and supporting the image-recording element at the image surface, a supporting shoe 72 is provided mounted on forward wall 42 in juxtaposition with pentaprism 68 and cooperating therewith to define a narrow passage through which the film unit is guided with the recording medium located at the image surface of lens 64. Shoe 72 may be biased toward the pentaprism to insure proper guidance of the moving film unit past the aperture.

The camera includes a film transport system for moving successive film units from container 10 at constant speed across the exposure aperture between pentaprism 68 and shoe 72 to effect the exposure of the film units and thereafter advance each film unit between a pair of pressure-applying members for distributing the liquid contents of container 18 between the image-recording and second elements of the film unit and then advance the film unit into the processing chamber; and while advancing the film unit through the camera as described, also pivoting mirror 66 in coordination with movement of the film unit to hold the image formed by lens 64 substantially stationary with respect to the portion of the image-recording element being exposed through the shutter aperture. It should be apparent from the preceding discussions that the rate of film movement may be very fast, e.g., nine inches per second, as compared with film advancement through ordinary "still" cameras adapted to produce pictures of the same size and that each complete film unit must be moved at a constant speed at this relatively fast rate during both exposure and processing.

The film transport system, in the form shown, comprises two endless conveyor members shown as flexible belts 74 mounted within the camera housing adjacent the wide walls thereof and supported on a first pair of pulleys 76 located closest the end of the camera in which lens 64 and mirror 66 are mounted, an intermediate pair of pulleys 78 located approximately near the midportion of the film pack mounted within the storage chamber very close to the forward wall of the film pack and a cylindrical fluid spreading member 80 mounted in the camera housing closely adjacent end wall 52. Thus, each belt 74 extends lengthwise of the camera housing from pulleys 78 to fluid spreading member 80 and includes a first longitudinal section, designated 82, extending from pulleys 76 across pulley 78 closely adjacent forward wall 20 of the film pack container 10 and thence into engagement with fluid spreading member 80, and a second longitudinal section 84 extending from fluid spreading member 80 between the latter and a second cylindrical fluid spreading member 86 juxtaposed with member 80, around a portion of the periphery of the member 86 and through processing chamber 62 forward of intermediate wall 58 to pulley 78. While the camera has been described as including a film transport system comprising two endless conveyor belts, it should be understood that the transport system may comprise but a single conveyor belt located adjacent either of the side walls of the camera housing and constructed and designed to operate in substantially the same manner as either of the two transport belts shown. According to another modification of the camera structure, portion 84 of the conveyor belt may pass to the rear of wall 58 then forward of the wall through processing chamber 62.

The transport system of the invention is designed to engage a film unit within the film pack container, advance the leading end portion of the film unit from the film pack container across the shutter aperture between pentaprism 68 and shoe 72 to a position wherein the leading end portion of the film unit is engaged to continue the motion of the film unit at the same speed and without interruption or hesitation. For this purpose, each of belts 74 includes a first projection 88 for engaging L-shaped drive member 28 of the film pack to advance the film engagement member 26 coupled therewith and engaged with a film unit, toward the opening 24 of the film pack; and a second projection 90 located ahead of first projection 88 for engaging a notch in the edge of the leading end portion of the film pack as the notch moves into alignment with projection 90. Thus, at least one of the edges of each film unit is formed with a pair of notches adapted to be engaged by projections 34 and 90 on the film engagement member 26 and belt 74 respectively. Projections 88 are located near the outer edges of belts 74 for engaging drive members 28 and second projections 90 are located near the inner edges of belt 74 so as to pass without engaging drive members 28 which are located toward the outside of the film pack container in position to be engaged by the first projections. The path of movement of first longitudinal section 82 and first projection 88 mounted thereon is close to forward wall 20 of the film pack at pulley 78 and then diverges from the rear wall of the film pack so as to disengage projection 88 from drive member 28 as the projection and drive member approach the leading end of the film pack. Guide plates 92 are provided to the rear of belts 74 in the region of the pentaprism 68 for causing the path of the belt to diverge from the forward wall of the film pack container so that projections 88 are disengaged from drive members 28.

Means are also provided in the camera for returning each drive member 28 to its initial position with a projection 34 in engagement with a notch in the edge of a film unit in readiness to be engaged by projection 88 following advancement of a preceding film unit from the film pack container. In a form shown, these last-mentioned means comprise an engagement member 94 mounted on a support plate 96 for reciprocating movement parallel with the direction of movement of belt 74 and positioned to engage drive member 28 of a film pack mounted within the storage chamber of the camera housing. The drive member is initially located behind engagement member 94 so as to move the engagement member toward the leading end of the film pack and an extension spring 98 is coupled with engagement member 94 for returning the engagement member and drive member to their initial positions shown in FIGURE 1 following disengagement of projection 88 from the drive member during a film advance and exposure cycle.

The means for pivoting mirror 66 in synchronism with the advancement of a film unit past the shutter aperture include a shaft 100 for pivotally mounting mirror 66, a crank 102 coupled with the shaft for rotating the shaft, a link 104 coupled with a cam follower 106 engaged with a cam 108 which rotates to pivot shaft 100. Cam 108 is rotated by a gear 110 meshed with a pinion gear 112 coupled with pulley 78 in turn driven by belt 74 and is designed to pivot the mirror through a predetermined angle during exposure and then return the mirror to its initial position during the interval prior to exposure of the next film unit. This construction assures coordination between the motion of mirror 66 and the movement of a film unit during exposure because both the film unit and the mirror are driven by the same belt.

The processing system of the invention comprises fluid spreading members 80 and 86, the former preferably being in the form of a cylindrical tube enclosing a conventional drive motor 114, e.g., spring driven or electrical. In the interest of compactness and in the case of an electric motor, cylinder 80 may comprise a component of the armature of the electric drive motor and also enclose a source of current such as batteries for powering the motor. Members 80 and 86 are mounted in juxtaposition with their axes substantially parallel and member 86 is biased toward member 80 so as to apply compressive pressure to a film unit during movement of the film unit between the two fluid spreading members. Belt 74 extends around spreading member 80 between the latter and end wall 52 and thence rearwardly between the two spreading members around spreading member 86 and then forwardly of a curved guide plate 116 which may comprise the end portion of inner forward wall 58. As the leading end portion of a film unit is engaged by projection 90, the film unit is advanced by the belt toward end wall 52 where it is guided around spreading member 80 in engagement with projection 90 by a curved guide plate 118 into the nip of the spreading members 80 and 86. From the nip of the spreading members, the leading end of the film unit is guided around spreading member 86 into processing chamber 62 by another guide plate 118. Guide plates 116 and 118 are positioned between the belts so as to engage the medial portion of the film unit and do not interfere with the projections 88 and 90 on the belts.

Springs 120 are provided within processing chamber 62 mounted on forward wall 60 for supporting the film units against the inner forward wall 58 during movement thereof into the processing chamber and insuring proper stacking of the film units within the processing chamber as each film unit is disengaged from projection 90 at pulleys 78. A lip 122 is provided on spring 120 extending across the opening into the processing chamber through which the film units and belts move for preventing admission of light into the rest of the camera when door 60 is opened. Lip 122 may be deflected by a film unit to permit its passage into the processing chamber so that the trailing end portions of film units stacked in the processing chamber will be located forward of the lip which then helps to guide succeeding film units into the chamber behind preceding film units already therein. Belts 74 are formed of a resilient sheet material such as metal, fabric, plastic or combinations thereof and preferably of a material that is incompressible and inelastic so as to minimize variations in the speed of movement of the film units due to stretching of the belt. This also permits the belt to cooperate in the spreading of the processing liquid by functioning to space the medial portions of the liquid spreading members a predetermined distance apart while preventing leakage of the processing liquid at the edges of the sheets of the film units. Projections 88 and 90 on the belt may be elastically deformable and compressible so as not to interfere with the advancement of the belt or the operation of the liquid spreading system.

In achieving the objects of the invention, the structure shown and described constitutes a very compact camera capable of exposing and processing successive photographic film units each in a little more than twice the time required for exposure in a conventional camera equipped with a focal plane shutter, to produce photographs equivalent to those produced by a conventional camera many times the size of the camera of the invention. This is made possible by novel exposure and processing systems each having as a basic component thereof, a film transport system capable of moving successive film units through the camera rapidly and at uniform rates during exposure and processing. The film transport system also functions as one element in the driving system of the camera and in this capacity, coordinates and controls the operation of the various components of the exposure and processing systems to insure and regulate proper exposure and processing.

Since certain changes may be made in the above apparatus of the invention herein involved, it is intended that all matter contained in the above description or shown in the accompanying drawings shall be interpreted as illustrative and not in a limiting sense.

What is claimed is:

1. A self-developing camera comprising, in combination:
   means defining an exposure station for exposing a photographic film unit during movement of said film unit through said exposure station;
   processing means including a pair of juxtaposed members for distributing a processing liquid in an exposed film unit during movement of said film unit between said members;
   endless, flexible conveyor means including first and second engagement members mounted thereon a predetermined distance apart;
   means including one of said juxtaposed members for supporting said conveyor means for movement along a predetermined path through said camera past said exposure station and between said juxtaposed member;
   drive means for advancing said conveyor means along said path;
   storage means for holding a film unit in an initial position with a leading end of said film unit located adjacent and to one side of said exposure station; and
   guide means including means for causing said first engagement member to advance a film unit leading end foremost past said exposure station, means for guiding said second engagement member into engagement with said moving film unit on the other side of said exposure station to continue the uninterrupted movement of said film unit past said exposure station, and means for guiding said exposed film unit in engagement with said second engagement member between said juxtaposed members.

2. A self-developing camera as defined in claim 1 wherein said guide means include means for guiding said first engagement member into engagement with said film unit to move said film unit through a predetermined distance from said initial position, means for guiding said first engagement member from engagement with said film unit following movement thereof through a predetermined distance and means for guiding said second engagement member into engagement with said film unit on said other side of said exposure station during movement of said film unit through said predetermined distance.

3. A self-developing camera as defined in claim 1 wherein said guide means include means for guiding said engagement member into engagement with film advance means engaged with said film unit to move said film advance means and said film unit engaged therewith from said initial position, means for guiding said second engagement member from engagement with said film advance means following movement thereof and said film unit through a predetermined distance from said initial position and means for guiding said second engagement member into engagement with said film unit on said other side of said exposure station during movement of said film unit through said predetermined distance.

4. A self-developing camera as defined in claim 1 including means for imaging a portion of the scene at said exposure station including means for moving the image of said scene at said exposure station relative thereto in the direction of movement of said film unit through said exposure station; said conveyor means being coupled with the last-mentioned means for driving the latter to move said image at the same speed as and in synchronism with movement of said film unit to retain said image stationary with respect to said film unit.

5. A compact self-developing camera comprising, in combination:
   a housing for mounting and enclosing the components of said camera;
   optical means located near one end of said housing for imaging a portion of a scene at an image surface located within said housing toward the opposite end thereof;
   guide means for supporting a portion of an image-recording element in position for exposure at said image surface;
   means for holding a film unit including an image-recording element in an initial position with the leading end of said film unit located adjacent said guide means and the trailing end of said film unit located adjacent said optical means;
   processing means including a pair of juxtaposed members mounted near said opposite end of said housing;
   film transport means for moving said film unit, leading end first, from said initial position toward said opposite end in engagement with said guide means to expose said image-recording element and thence between said juxtaposed members to process said image-recording element and toward said one end of said housing to a terminal position; and
   said film transport means including endless conveyor means supported for movement along a closed path extending from said opposite end of said housing toward said one end thereof and return, means for guiding the return portion of said conveyor means past said guide means and means mounted on said conveyor means for engaging and moving said film unit during exposure and processing and depositing said film unit in said terminal position.

6. A camera as defined in claim 5 wherein said film transport means include a first engagement member mounted on said conveyor means for advancing the leading end section of said film unit from said initial position into engagement with and past said guide means and a second engagement member mounted on said conveyor means a predetermined distance ahead of said first engagement member for engaging said leading end section of said film unit on the opposite side of said guide means for continuing the movement of said film unit past said guide means and between said juxtaposed members.

7. A camera as defined in claim 5 wherein one of said juxtaposed members is generally cylindrical and is mounted for rotation about its axis within said opposite end of said housing, said conveyor means extend around said one juxtaposed member and said film transport means include means for rotating said one juxtaposed member.

8. A camera as defined in claim 7 including means for moving said image at said image surface in the same direction and at substantially the same speed as said image-recording element, the last-mentioned means being coupled with said conveyor means for actuation thereby.

9. A camera as defined in claim 5 comprising means dividing said housing lengthwise into a first chamber for holding said film unit in said initial position and a second chamber for holding said film unit in said terminal position, means providing indepedent access to said chambers to permit loading of said film unit into said first chamber and withdrawal of said film unit from said second chamber and means cooperating with said conveyor means for guiding said film unit into said second chamber into said terminal position of said film unit and disengaging said film unit from said conveyor means when said film unit is in said terminal position.

10. A camera as defined in claim 9 wherein said chambers are constructed to hold a rectangular film unit in generally planar positions.

11. A camera as defined in claim 9 including means in said first chamber for holding a plurality of film units in stacked relation and means for guiding said conveyor means through said first chamber to advance the leading end portions of successive film units from said initial positions thereof toward said guide means.

12. A camera as defined in claim 9 including a film engagement element for engaging the film unit in said initial position thereof, mounted for reciprocating motion in said first chamber, means for guiding said conveyor means into engagement with said film engagement element to move the latter and a film unit engaged therewith toward said guide means and means for guiding said conveyor means from engagement with said film engagement element following movement thereof through a predetermined distance.

13. A camera as defined in claim 12 including means for holding a plurality of film units in said first chamber, and means for returning said film engagement element to a position for engagement with a film unit following disengagement of said film engagement element from said conveyor means and a preceding film unit.

14. A camera as defined in claim 9 wherein said conveyor means extend through said second chamber substantially from end to end thereof.

References Cited

UNITED STATES PATENTS

| | | | |
|---|---|---|---|
| 2,508,650 | 5/1950 | Pratt et al. | 88—24 |
| 2,682,194 | 6/1954 | Rosenburgh | 88—24 |
| 3,002,437 | 10/1961 | Eloranta | 95—13 |
| 3,033,091 | 5/1962 | Eloranta | 95—13 |
| 3,234,865 | 2/1966 | Scott | 95—15 X |

NORTON ANSHER, *Primary Examiner.*

CHARLES B. FUNK, *Assistant Examiner.*

U.S. Cl. X.R.

128—6

UNITED STATES PATENT OFFICE
CERTIFICATE OF CORRECTION

Patent No. 3,426,664        Dated February 11, 1969

Inventor(s) Robert L. Norton

It is certified that error appears in the above-identified patent and that said Letters Patent are hereby corrected as shown below:

Column 1, line 36, "Patent No. 3,316,823, issued May 2, 1967' should be --Patent No. 3,405,619, issued October 15, 1968--.

Signed and sealed this 7th day of January 1975.

(SEAL)
Attest:

McCOY M. GIBSON JR.
Attesting Officer

C. MARSHALL DANN
Commissioner of Patents